US006797049B1

(12) United States Patent
Schwetlick

(10) Patent No.: US 6,797,049 B1

(45) Date of Patent: Sep. 28, 2004

(54) MIXTURE FOR THE TREATMENT OF WASTE MATERIALS

(75) Inventor: Wolfgang Schwetlick, Walchwil (CH)

(73) Assignee: Geodur Cis AG, Zug (CH)

( * ) Notice: Subject to any disclaimer, the term of this patent is extended or adjusted under 35 U.S.C. 154(b) by 0 days.

(21) Appl. No.: 10/048,672

(22) PCT Filed: Aug. 2, 2000

(86) PCT No.: PCT/EP00/07486

§ 371 (c)(1), (2), (4) Date: Jun. 12, 2002

(87) PCT Pub. No.: WO01/08753

PCT Pub. Date: Feb. 8, 2001

(30) Foreign Application Priority Data

Aug. 2, 1999 (DE) ........................................ 199 36 324

(51) Int. Cl.[7] ................................................ C04B 18/04

(52) U.S. Cl. ....................... 106/665; 106/666; 106/708; 210/728; 210/749; 210/912; 252/181; 588/252; 588/256

(58) Field of Search ................................. 106/640, 661, 106/662, 664, 665, 666, 708, 709; 210/702, 719, 728, 729, 749, 757, 912–914; 252/180, 181; 588/252, 256, 257

(56) References Cited

U.S. PATENT DOCUMENTS

| | | | | |
|---|---|---|---|---|
| 4,190,456 A | * | 2/1980 | Absolon et al. | 106/661 |
| 4,432,666 A | | 2/1984 | Frey et al. | |
| 4,497,663 A | * | 2/1985 | Fisher et al. | 588/255 |
| 4,518,508 A | * | 5/1985 | Conner | 588/257 |
| 4,601,832 A | * | 7/1986 | Hooykaas | 588/236 |
| 4,954,230 A | | 9/1990 | Kirch | |
| 5,273,667 A | * | 12/1993 | Gill et al. | 252/25 |
| 6,071,994 A | | 6/2000 | Hummerich et al. | |
| 6,169,124 B1 | | 1/2001 | Horn et al. | |

FOREIGN PATENT DOCUMENTS

| | | |
|---|---|---|
| CN | 1066672 | 12/1992 |
| DE | 23 47 996 | 4/1975 |
| DE | 23 49 276 | 4/1975 |
| DE | 35 45 321 | 6/1987 |
| DE | 39 24 100 | 1/1991 |
| DE | 41 03 865 | 8/1992 |
| DE | 195 25 665 | 1/1997 |
| DE | 195 43 304 | 5/1997 |
| DE | 197 27 030 | 1/1999 |
| DE | 198 04 325 | 8/1999 |
| GB | 2 147 296 | 5/1985 |
| GB | 2154996 | 9/1985 |
| GB | 2 167 741 | 6/1986 |
| SU | 1310411 | 5/1987 |
| WO | WO 9323087 | 11/1993 |
| WO | WO09708112 | 3/1997 |

* cited by examiner

*Primary Examiner*—Peter A. Hruskoci
(74) *Attorney, Agent, or Firm*—Michael Best & Friedrich LLP

(57) ABSTRACT

The invention relates to a mixture and a process for the treatment of waste materials and the use of the mixture for the treatment of waste materials and waste material treated therewith. The mixture comprises (A) at least one zinc salt of a saturated or unsaturated aliphatic or aromatic carboxylic acid, (B) at least one calcium salt of a saturated or unsaturated aliphatic or aromatic carboxylic acid, (C) at least one hydrophobing agent, (D) at least on amino alcohol and (E) $NH_3$.

12 Claims, No Drawings

MIXTURE FOR THE TREATMENT OF WASTE MATERIALS

CROSS-REFERENCE TO RELATED APPLICATIONS

This application is a 35 U.S.C. 371 application of and claims priority to PCT/EP00/07486, the international filing date of which is Aug. 2, 2000, which claims priority to German application no. 19936324.2 filed on Aug. 2, 1999. This 371 application claims priority to German application no. 19936324.2 filed on Aug. 2, 1999. The content of each of these applications is hereby fully incorporated by reference.

BACKGROUND OF THE INVENTION

The invention relates to a mixture and a process for the treatment of waste materials and the use of this mixture in the treatment of waste materials.

Normally, waste materials are either disposed without treatment or after incineration in an incinerator. It is of importance that waste materials after leaching with water keep defined threshold values for contaminants. These contaminants may be heavy metals for example Cd, Cr, Hg, Cu, Ni or Pb, and/or organic contaminants. For this purpose waste materials are treated with cement and/or other materials with pozzolanic properties.

In another such process, a waste material such as fly ash is washed to neutral wherein soluble salts are dissolved and thereby washed out. In a next step, the suspension is drained and the dewatered material is mixed with a binding agent, such as cement. The pasty mixture is cast for hardening either in blocks or is disposed directly on a landfill. Alternatively, fly ash and filter cake from the incinerator may be mixed directly with binding agents and clay.

A disadvantage of these processes is the relatively high consumption of cement and combined therewith a large volume increase and high cost. In addition, traditional processes are insufficient to prevent the leaching of ecologically hazardous contaminants from treated waste materials.

Waste materials are increasingly being re-used. A lot of waste materials, for example lime sludge or sludge from wastewater treatment, include valuable contents such as CaO, $Al_2O_3$ and silicate. These can be re-used for clinker production in cement production. Clinker is an intermediate product for the production of cement, which is usually produced from natural raw meal consisting essentially of CaO, $Al_2O_3$, $SiO_2$ and $Fe_2O_3$. Part of the natural raw meal can be replaced depending on the composition of the waste material.

In the case of re-use, it is also necessary that the re-used waste materials do not exceed certain threshold values for the leaching of contaminants such as heavy metals.

Therefore, the problem underlying the invention was to provide a mixture and a process for the treatment of waste materials, which overcome the above shortcomings.

SUMMARY OF THE INVENTION

In one aspect, the invention provides a mixture suitable for treatment of waste materials. The mixture includes (A) at least one zinc salt of a saturated or unsaturated aliphatic or aromatic carboxylic acid, (B) at least one calcium salt of a saturated or unsaturated aliphatic or aromatic carboxylic acid, (C) at least one hydrophobing agent, (D) at least one amino alcohol, and (E) $NH_3$.

In another aspect, the invention provides a process for the treatment of waste materials. The process includes adding a mixture to waste material, and mixing of the mixture and waste material. The mixture may include (A) at least one zinc salt of a saturated or unsaturated aliphatic or aromatic carboxylic acid, (B) at least one calcium salt of a saturated or unsaturated aliphatic or aromatic carboxylic acid, (C) at least one hydrophobing agent, (D) at least one amino alcohol, and (E) $NH_3$.

In yet another aspect, the invention provides a treated waste material made by a process comprising adding a mixture to waste material and mixing the mixture and the waste material to form the treated waste material. The mixture may comprise at least one zinc salt of a saturated or unsaturated aliphatic or aromatic carboxylic acid, (B) at least one calcium salt of a saturated or unsaturated aliphatic or aromatic carboxylic acid, (C) at least one hydrophobing agent, (D) at least one amino alcohol and (E) $NH_3$.

DETAILED DESCRIPTION OF THE INVENTION

In one embodiment, the invention provides a mixture suitable for treatment of waste materials. The mixture includes (A) at least one zinc salt of a saturated or unsaturated aliphatic or aromatic carboxylic acid, (B) at least one calcium salt of a saturated or unsaturated aliphatic or aromatic carboxylic acid, (C) at least one hydrophobing agent, (D) at least one amino alcohol, and (E) $NH_3$.

Component (A) is at least one zinc salt of a saturated or unsaturated aliphatic or aromatic carboxylic acid. Preferably component (A) is at least one zinc salt of a saturated or unsaturated fatty acid, in particular of a saturated or unsaturated fatty acid with 1 to 30 carbon atoms, such as palmitoleic acid, oleic acid, erucic acid, palmitic acid, margaric acid, stearic acid, arachic acid or behenic acid or mixtures thereof. Especially preferable component (A) is the zinc salt of stearic acid.

Component (A) can optionally comprise at least two zinc salts. Preferably, one of the zinc salts has an active content of at least 15%, in particular 17%. The active content of the zinc salt describes the stoichiometric quantity of zinc salt within the aqueous solution.

Component (B) is at least one calcium salt of a saturated or unsaturated aliphatic or aromatic carboxylic acid. Preferably, component (B) is at least one calcium salt or a saturated or unsaturated fatty acid. The definition of the fatty acid is as described for component (A).

Component (C) is at least one hydrophobing agent. Hydrophobing agents are known for plaster and concrete. These agents can be used to make construction materials containing lime and/or cement water repellent. The reaction of hydrophobing agents with the basic components of binding agents can be described as follows:

$$2R—COO—A+Ca(OH)_2 \rightarrow (R—COO)_2Ca+2A—OH$$

wherein the group R—COO— represents the group of a saturated or unsaturated aliphatic or aromatic carboxylic acid and the group A is an amine group. The group of a saturated and unsaturated aliphatic or aromatic carboxylic acid is preferably a fatty acid group. The definition of the fatty acid is as described above for component (A).

An example of a commercially available hydrophobing agent is a reactive hydrophobing agent distributed under the trade name “Liga MS” by Peter Greven Fett-Chemie GmbH & Co. KG. Another example for hydrophobing agents are invert soaps, such as alkylammonium salts, wherein the alkyl group can be saturated or unsaturated and preferably has 1 to 30 carbon atoms. Optionally component (C) can be added in a mixture of alcohol and water.

Component (D) is at least one amino alcohol. Preferably, component (D) is selected from the group consisting of mono-, di-, triethanol amine, dimethyl amino ethanol, diethyl amino ethanol, N-methyl diethanol amine, mono-, di- and triisopropanol amine, especially triethanol amine.

In addition, the mixture comprises as component (E) $NH_3$.

Preferably the mixture contains 50–90% by weight, preferably 70–80% by weight of component (A). If component (A) comprises two zinc salts, then it may contain 60–70% by weight, especially 65–68% by weight of a first zinc salt and 5–15% by weight, especially 8–10% by weight of a second zinc salt with an active content of at least 15%, especially at least 17%. In addition the mixture contains preferably 0.1–10% by weight, preferably 2–5% by weight of component (B), 5–20% by weight, especially 12–15% by weight of component (C), 0.1–10% by weight, preferably 2–5% by weight of component (D) and 0.01–5.0% by weight, preferably 0.1–0.7% by weight of component (E).

The mixture can be diluted with a solvent. The solvent can be selected from the group consisting of water, an alcohol and a mixture thereof. The alcohol can be selected from ethanol, isopropanol or butyl alcohol. The solvent is preferably a mixture of water and alcohol consisting preferably of 85% by weight of water and 15% by weight of alcohol. Preferably, at least 80 to 99% by weight of the solvent based on the weight of the total mixture is added, preferably 90 to 98% by weight.

In addition the mixture can contain further additives, preferably selected from the group consisting of agents to precipitate heavy metals, as sodium sulphide, reducing agents, like $FeSO_4$, complexing agents, such as mercaptan compounds, binding agents, such as Portland cement or pozzolanic materials, such as ashes from sludge incineration. Examples for other useful additives are $FeCl_3$, $NaHSO_3$, urea and water glass. The kind and quantities of the additives can be chosen according to the type and concentration of contaminants within the waste materials.

The mixture of the invention may especially be used for the treatment of waste materials, such as contaminated soil, industrial waste materials from the coal and steel industry, the metal processing industry and the chemical industry, sludge from industrial and communal waste water treatment, residues from paper production or residues from soil washing and municipal and hazardous waste incineration.

The mixture of the invention is suitable for treatment of solid and aqueous waste materials with inorganic and organic contaminants like heavy metals, water-soluble salts and organic compounds.

In another embodiment, the invention provides a process by which a mixture of the invention is added to the waste materials. Preferably 0.01 to 5.0, more preferred 0.05 to 0.15 and in particular 0.12% by weight of the mixture based on the weight of the waste material is added. Depending on the quantity of contaminants within the waste materials the mixture of the invention is added undiluted or diluted with water. With a quantity of contaminants of <5000 mg/ton of waste material it is preferred to add the mixture of the invention diluted with water, wherein the ratio of the mixture to water is preferably 1:20 to 1:10. If the quantity of contaminants within the waste material is between >5000 mg/ton of waste material and <50000 mg/ton waste material, it is preferred to dilute the mixture of the invention with water, the ratio of the mixture of the invention to water is preferably 1:10 to 1:5. If the quantity of contaminants is >50000 mg/ton waste material, it is preferred to dilute the mixture of the invention with water, the ratio of the mixture of the invention to water is preferably 1:5 to 1:2.5.

In the process of the invention, the composition of the waste materials can optionally be analyzed before addition of the mixture. Usually 95 to 100% of the components within the waste materials are analyzed, preferably 95–98% of the components. The waste materials are analyzed for critical concentrations of heavy metals with reference to the planned re-use, such as heavy metals, CaO, $Al_2O_3$, $Fe_2O_3$, $P_2O_5$, $SiO_2$, trace components, such as mangan, fluor or phosphor and anions as chlorides, cyanides and sulphates. Such analysis is not necessary if the composition of the waste materials is known.

The concentration of optional further additives such as reducing agents and complexing agents can be calculated and adapted to the contaminant load in the waste materials.

By the addition of the mixture of the invention contaminants such as heavy metals in waste materials are immobilized. The contaminants are modified through chemical and physical processes in such a way that the contaminants do not leach from the waste materials. Contaminants can be immobilized e.g. through formation of complexes, salt formation, precipitation and change of pH-value or density of waste materials.

After addition of the mixture of the invention and optional additional additives the components are mixed in a step (b). For mixing, standard mixing equipment or modified mixing plants can be used. If the mixing plants are modified energy input, i.e. mixing with higher velocity, mixing time, mixing phases and control of reaction temperature can be varied in a known manner. Through higher energy input the homogenization of different components is improved. The energy input is preferably at least about 60 ampère, especially 75 ampère. The mixing time is preferably at least 3.5 minutes, in particular 4–10 minutes and the reaction temperature is at least about 20° C., preferably at least about 35° C.

The mixture of the invention and the optional additional additives can be added simultaneously or batch wise to the waste material. If it is desirable to control the process of reaction, the mixture and the optional additional additives are preferably added batch wise after each other to produce defined intermediate products. If the mixture of the invention is added in several batches during the mixing process the temperature and the pH-value of the obtained mixture during the additional steps can be controlled. Through this it may be ensured that the reaction of the contaminants is nearly complete.

Through the process of the invention, the material needs for the immobilization of waste materials can be minimized. In addition, the volume-increase of waste materials is lower than with processes in which the mixture of the invention is not used. Preferably the volume-increase should be from 1.15 to 1.35. The consequences are a lower total cost for material, treatment, transportation and disposal of the waste materials. Treated waste materials additionally show secure compliance with leaching threshold values even by using test procedures for the testing of longterm-behaviour. Another advantage of the process of the invention is that waste materials such as fly ash can be treated without prior washing.

Treated waste materials can be mixed with hydraulic binding agents. Hydraulic binding agents can be selected from a group consisting of cement, clay and Portland cement. Waste materials mixed with a hydraulic binding agent are preferably stored on a landfill.

Waste materials treated with the process of the invention can be also re-used for the production of secondary materials for construction, cement feedstock or plant nutrient pellets. Waste materials treated with the process of the invention can be used in landfill construction as profile materials, gas permeable support layers or support grains for the integration of residue packing. Depending on the composition the waste materials treated according to the invention can be used as $Al_2O_3$-, $Fe_2O_3$-and/or $SiO_2$- replacement products to correct a missing content of $Al_2O_3$, CaO, $Fe_2O_3$ and $SiO_2$ in natural quarry material for balancing a concentration of contaminants which is too high in raw meal such as sulphur or for balancing of concentrations of CaO which are too high. Materials treated with the process of the invention can be also for production of plant nutrient pellets with defined nitrogen amounts.

For the production of secondary raw materials especially washing residues from base material production on and soil washing plants, industrial solid materials from the coal and steel industry, from the metal processing industry and the chemical industry and paper production, sludge from industrial and communal waste water treatment, slag and filter ash from paper and regular sludge incineration and wood and coal power plants are used. Waste materials treated with the process of the invention can be pelletised or granulated after treatment. Pelletising is especially used for waste materials such as filter ash; sludge or residues from industrial production and granulating for treated contaminated soil. The range of potential re-use is increased substantially thereby.

The patent is illustrated with the following examples.

EXAMPLE 1

To a 1 liter flask 67 g zinc stearate, 9.5 g zinc stearate with an active content of 15%, 4.7 g calcium stearate, 14.3 g palmitin ammonium chloride, 4 g triethanolamine, and 0.5 g $NH_3$ were added. The obtained mixture was stirred for at least 30 minutes at about 20° C.

EXAMPLE 2

To 59.45 kg of electro filter ash MVA from the municipal waste incinerator in Zurich 0.12 kg of the mixture from Example 1 were added and mixed for 1 minute. Subsequently 15.85 kg Portland cement were added and mixed for 4.0 minutes. Then 24.58 kg water were added and mixed for 1.5 minutes. The temperature during mixing was 36.5° C. Treated waste material was obtained showing a pH-value of 11.6 after the treatment and a pH-value of 10.9 after 28 days.

EXAMPLE 3

50.26 kg washed electro filter ash MVA and 14.52 kg wastewater treatment sludge from municipal waste incinerator in Zurich were mixed for 2 minutes. Subsequently 0.12 kg of the mixture from Example 1 were added and mixed for 1 minute. Then 15.96 kg Portland cement were added and mixed for 4 minutes. Subsequently 19.14 kg water were added and mixed for 1,5 minutes. The temperature during mixing was 42.1° C., Treated waste material was obtained showing a pH-value of 11.6 after treatment and a pH-value of 10.8 after 28 days.

EXAMPLE 4

49.94 kg of washed electro filter ash, 14.43 kg of wastewater treatment sludge and 3.96 kg of paper sludge incineration ash from municipal waste incineration in Zurich were mixed for 3 minutes. Subsequently 0.12 kg of the mixture from Example 1 were added and mixed for 1 minute. Subsequently 1.51 kg of $FeCl_3$ and 1.51 kg of water glass were added and after each addition mixed for 2 minutes. Subsequently 9.9 kg of Portland cement were added and mixed for 4 minutes. After this 18.63 kg of water were added and mixed for 1.5 minutes. The temperature during mixing was 39.5° C. Treated waste material was obtained showing a pH value of 11.5 after treatment and a pH-value of 10.7 after 28 days.

EXAMPLE 5

To 63.16 kg of electro filter ash from municipal waste incinerator in Horgen (Switzerland) 0.12 kg of a mixture consisting of 1 part of the mixture from Example 1 and 5 parts of water were added and mixed for 1 minute. Subsequently 2.05 kg of urea and 1.50 kg of $FeSO_4$ were added and after each addition mixed for 2 minutes. After this 14.17 kg of Portland cement were added and mixed for 4 minutes. Subsequently, 19.00 kg water were added and mixed for 1.5 minutes. The temperature during mixing was 68.8° C. Treated waste material was obtained showing a pH-value of 10.6 after treatment and a pH-value of 10.4 after 28 days.

EXAMPLE 6

33.55 kg washed electro filter ash and 40.00 kg of wastewater treatment sludge were mixed for 2 minutes. Subsequently 0.12 kg of the same mixture as in Example 5 were added and mixed for 1 minute. Subsequently 14.12 kg of Portland cement were added and mixed for 4 minutes, After this 12.21 kg of water were added and mixed for 1.5 minutes. The temperature during mixing was 39° C. Treated waste material was obtained showing a pH-value of 11.4 after treatment and a pH-value of 10.7 after 28 days.

EXAMPLE 7

59.06 kg of washed electro filter ash and 6.21 kg of paper sludge incineration ash from Horgen were mixed for 3 minutes. Subsequently 0.12 kg of the same mixture as in Example 5 were added and mixed for 1 minute. Subsequently 1.33 kg of water glass and 1.57 kg of $NaHSO_3$ were added and after each addition mixed for 2 minutes. Subsequently 10.35 kg of Portland cement were added and mixed for 4 minutes. After this 21.36 kg of water were added and mixed for 1.5 minutes. The temperature during mixing was 56° C. Treated waste material was obtained showing a pH-value of 10.8 after treatment and a pH of 10.2 after 28 days.

EXAMPLE 8

82.60 kg of contaminated soil from a gas plant area were mixed with 0.12 kg of the same mixture as in Example 1 for 2 minutes. Subsequently 6.60 kg of cement were added and mixed for 2 minutes. After this 10.68 kg of water were added and mixed for 1.5 minutes. The temperature during mixing was 25° C. Treated waste material was obtained showing a pH-value of 11.3 after treatment and a pH-value of 10.2 after 28 days.

What is claimed is:

1. A mixture suitable for treatment of waste materials, the mixture comprising:

(A) at least one zinc salt of a saturated or unsaturated aliphatic or aromatic carboxylic acid;

(B) at least one calcium salt of a saturated or unsaturated aliphatic or aromatic carboxylic acid;

(C) at least one hydrophobing agent;

(D) at least one amino alcohol; and (E) $NH_3$, the mixture being suitable for treatment of waste materials and comprising 50–90% by weight of component (A); 0.1–10% by weight of component (B); 5–20% by weight of component (C); 0.1–10% by weight of component (D); and 0.01–5% by weight of component (E).

2. The mixture according to claim 1, wherein component (A) is at least one zinc salt of a saturated or unsaturated fatty acid.

3. The mixture according to claim 2, wherein the fatty acid is selected from the group consisting of saturated fatty acids with 1 to 30 carbon atoms.

4. The mixture according to claim 3, wherein the fatty acid is stearic acid.

5. The mixture according to claim 1, wherein component (B) is at least one calcium salt of a saturated or unsaturated fatty acid.

6. The mixture according to claim 5, wherein the fatty acid is selected from the group consisting of saturated fatty acids with 1 to 30 carbon atoms.

7. The mixture according to claim 6, wherein the fatty acid is stearic acid.

8. The mixture according to claim 1, wherein component (C) is an invert soap.

9. The mixture according to claim 1, wherein component (D) is selected from the group consisting of mono-, di-, triethanol amine, dimethyl amino ethanol, diethyl amino ethanol, N-methyl diethanol amine, mono-, di- and triisopropanol amine.

10. The mixture according to claim 1 further comprising water.

11. The mixture according to claim 1 further comprising agents for precipitation of heavy metals, reducing agents, complexing agents, binding agents and/or agents with pozzolanic properties.

12. The mixture according to claim 1, wherein when the mixture is mixed with a waste material to form a treated waste material, the treated waste material does not increase in volume and the treated waste material can be reused.

* * * * *